UNITED STATES PATENT OFFICE 2,437,527

INSECTICIDAL COMPOSITIONS FROM HALOCAPRYLPHENOXYACETIC ACID

William F. Hester, Drexel Hill, and W E Craig, Philadelphia, Pa., assignors to Röhm & Haas Company, Philadelphia, Pa., a corporation of Delaware No Drawing. Application June 14, 1945, Serial No. 599,510

10 Claims. (Cl. 167—30)

This invention relates to insecticidal compositions which may be applied to living plants infested with soft-bodied insects to control the insects without damage to the plants. More specifically, this invention deals with compositions comprising a halocaprylphenoxyacetic acid and a carrier therefor.

The toxic agents which are incorporated with a carrier and used in sprays or dusts have the basic structure

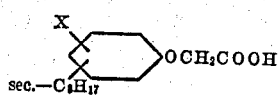

wherein X is a halogen selected from bromine and chlorine. In addition to these two phenyl substituents, there may be present one or more nuclear substituents, such as one or more additional halogen atoms, hydrocarbon substituents such as methyl, ethyl, butyl, amyl, or octyl, alkoxy, including methoxy, ethoxy, and the like, nitro, amino, or acyl, such as acetyl, butyryl, and the like.

Compounds of the above structure may be prepared by known procedural steps. For example, caprylphenoxyacetic acid may be formed by reacting sodium caprylphenate with chloroacetic acid, and the resulting acid may be halogenated. Other nuclear substituents may be introduced at the most appropriate stage. By way of example, other hydrocarbon groups than capryl may be introduced into the starting phenol or the caprylphenoxyacetic acid or halocaprylphenoxyacetic acid may be further substituted, as by nitration. The nitro group may be reduced to amino, if so desired. Other variations will be obvious to those skilled in the art.

When the halocaprylphenoxyacetic acid has been prepared, it may be taken up in a carrier. If a solvent is used, a mixture is obtained which may be dispersed in water and applied to vegetation as a spray. On the other hand, the halocaprylphenoxyacetic acid may be taken up in or on a finely divided solid or mixture of solids and applied either in a spray or as a dust.

The preparation of the halocaprylphenoxyacetic acids, preparation of insecticidal compositions therefrom, and application of these to living plants are further described in the examples which follow.

Example 1

*Preparation of bromocaprylphenoxyacetic acid.*—To a solution of 1850 grams of caprylphenoxyacetic acid in about 3150 grams of ethylene chloride, there was gradually added 1120 grams of bromine over the course of thirty-five minutes. During this time, the mixture was stirred and maintained at 23° to 28° C. by external cooling. The cooling bath was then removed, and stirring was continued for two hours. Thereupon, water was carefully added. An oil layer separated, which was washed several times with water in volume equal to the oil. The ethylene chloride solution was then evaporated to yield bromocaprylphenoxyacetic acid of 98% purity by bromine analysis.

Example 2

*Preparation of bromonitrocaprylphenoxyacetic acid.*—Bromocaprylphenoxyacetic acid prepared as described in Example 1 in ethylene chloride solution, 2330 grams of said acid being present in a solution having a volume of 4372 cc., was treated with 965 grams of 88% nitric acid with stirring. During the addition of nitric acid, the temperature was held below 38° C. by external cooling. When all of this acid had been added, however, the temperature rose to 55° C. and was again controlled by cooling. The mixture was then stirred for four and a quarter hours with the temperature maintained at about 50° C. The resulting ethylene chloride solution was washed three times with large volumes of water, dried, and concentrated under reduced pressure. A residue of 2442 grams of a dark-colored oil was obtained. This contained by analysis under 3% of nitrogen (3.6% theory) and 19.8% of bromine (20.6% theory).

By similar methods, there may be prepared such compounds as:

Chlorocaprylphenoxyacetic acid
Dichlorocaprylphenoxyacetic acid
Dibromocaprylphenoxyacetic acid
Chlorobromocaprylphenoxyacetic acid
Nitrochlorocaprylphenoxyacetic acid
Nitrodibromocaprylphenoxyacetic acid
Nitrodichlorocaprylphenoxyacetic acid
Bromomethylcaprylphenoxyacetic acid
Chlorotert.-butylcaprylphenoxyacetic acid
Bromomethoxycaprylphenoxyacetic acid
Bromoacetylcaprylphenoxyacetic acid
Bromohydroxycaprylphenoxyacetic acid One or more of these compounds may be used as the active insecticidal principle or may be used in conjunction with other toxicants, such as pyrethrins, rotenone, organic thiocyanates, or other synthetic organic toxicants. They may also be used in conjunction with fungicides.

For use in sprays, a halocaprylphenoxyacetic acid may be dissolved in a relatively innocuous medium, such as pine oil, an alkylated benzene, a mineral or vegetable oil, or the like, and dispersed in water with the aid of an emulsifier or wetting agent. If desired, an oil-soluble emulsifier, such as octylphenoxypolyethoxyethanol or a polyglycerol-fatty acid condensate, may be added to the solvent solution of a halocaprylphenoxyacetic acid.

A typical self-emulsifying composition is prepared from

| | Parts |
|---|---|
| Toxicant | 1 |
| Pine oil | 2 |
| Emulsifier | 1 |

One part of this composition may be added to 100 to 500 parts of water to give a dilute dispersion which is readily applied as a spray.

Another typical composition may be prepared from

| | Parts |
|---|---|
| Toxicant | 1 |
| Acetone | 2 to 3 |
| Emulsifier | $\frac{1}{10}$ to $\frac{1}{4}$ |

This may likewise be mixed with water to form a spray.

On the other hand, the toxicants of this invention may be taken up with finely divided solids and applied either in a spray or dust. For example, one part of toxicant may be mixed with 98 parts of talc and one part of a spreader mixed therewith. Dusts may suitably be made with $\frac{1}{2}$ to 10% of one or more of the toxicants of this invention.

More details of the preparation and application of the insecticidal compositions of this invention are given in the following examples.

Example 3

(a) Bromocaprylphenoxyacetic acid was dissolved in acetone and the resulting solution taken up with a clay having a small size of particles. The mixture was then warmed to drive off most of the solvent. The concentration of active agent was adjusted to 2%. The resulting dust was then applied to bean plants infested with the black bean aphid. After twenty-four hours, an examination of the plants indicated that 61% of the aphids were dead.

(b) The same compound was applied to magnesium carbonate to give a composition containing one part of the toxicant and four parts of the carbonate. This composition was mixed with water to give a spray containing one part of toxicant in 200 parts of water, which was then applied to bean plants infested with bean beetle larvae. A 90% control was thus obtained in twenty-four hours.

Example 4

(a) Chlorocaprylphenoxyacetic acid was taken up in a ratio of 5 to 4 with the reaction product of polyglycerol, coconut fatty acid, and a little maleic acid. This composition was dispersed in water at one pound to one hundred gallons and sprayed on nasturtiums infested with aphids. A control of 90% was obtained within twenty-four hours.

(b) A similar spray in which the chlorocaprylphenoxyacetic acid was present at one part in twelve hundred parts of spray was applied to bean plants infested with red spider. A control of 64% was obtained within the day of application. A higher concentration gave a higher control, still without damage to the host plants.

Example 5

The tests reported in Example 4 were also made with dichlorocaprylphenoxyacetic acid. The control of aphids on nasturtiums was 64%, while the control of red spiders was 88%.

Example 6

Tests such as reported in Examples 4 and 5 were made with chloronitrocaprylphenoxyacetic acid. The control of aphids on nasturtiums was 90%, while the control of red spiders was 70%.

Example 7

The tests carried out above were also made with dichloronitrocaprylphenoxyacetic acid. The control of aphids on nasturtiums was 82%, while the control of red spiders was 96%.

Example 8

(a) A solution of one part of bromonitrocaprylphenoxyacetic acid was made in two and a half parts of pine oil and one half part of an oil-soluble sulfonated petroleum oil. This composition was dispersed in water at one part of the toxicant to 1400 parts of water and applied as a spray to nasturtiums infested with aphids. The aphid infestation was completely wiped out.

(b) A dust was prepared by mixing bromonitrocaprylphenoxyacetic acid with very fine talc and diluting this with clay containing about one part per one hundred parts of the condensate of polyglycerol, lauric acid, and a little maleic acid to give a finished dust containing one and a quarter per cent of the bromonitrocaprylphenoxyacetic acid. When this dust was applied to nasturtiums infested with aphids, it gave a kill after twenty-four hours of 98%. It is interesting to note that a control run at the same time with a standard derris dust gave a control of 15%.

(c) A dust prepared with magnesium carbonate containing 1% of the bromonitrocaprylphenoxyacetic acid gave a control of 89% of Mexican bean beetle larvae on bean plants.

(d) A dust containing 2% of the above toxicant was prepared with magnesium carbonate and talc. It gave a control of 100% of tent caterpillars on wild cherry.

The insecticidal compositions which comprise a halocaprylphenoxyacetic acid and a carrier therefor provide good control of many types of insects on living plants with safety. While this toxicant has been shown as used above in its free acid form, these acids may also be used at least partially in the form of salts, as results when used in connection with lime or alkali soaps. These salts are also effective as toxic agents.

We claim:

1. An insecticidal composition comprising as a toxic agent a halocaprylphenoxyacetic acid and a carrier therefor.

2. An insecticidal composition comprising as a toxic agent a chlorocaprylphenoxyacetic acid and a carrier therefor.

3. An insecticidal composition comprising as a toxic agent a bromocaprylphenoxyacetic acid and a carrier therefor.

4. An insecticidal composition comprising bromonitrocaprylphenoxyacetic acid and a carrier therefor.

5. An insecticidal composition comprising chloronitrocaprylphenoxyacetic acid and a carrier therefor.

6. An insecticidal composition comprising bromonitrocaprylphenoxyacetic acid dispersed with a solid carrier therefor.

7. An insecticidal composition comprising chloronitrocaprylphenoxyacetic acid dispersed with a solid carrier therefor.

8. A process of controlling soft-bodied insects on living plants which comprises applying thereto a composition comprising a minor proportion of a halocaprylphenoxyacetic acid and a major proportion of a carrier therefor.

9. A process of controlling soft-bodied insects on living plants which comprises applying thereto a composition comprising a minor proportion of bromonitrocaprylphenoxyacetic acid and a major proportion of a carrier therefor.

10. A process of controlling soft-bodies insects on living plants which comprises applying thereto a composition comprising a minor proportion of chloronitrocaprylphenoxyacetic acid and a major proportion of a carrier therefor.

WILLIAM F. HESTER.
W E CRAIG.

REFERENCES CITED

The following references are of record in the file of this patent:

UNITED STATES PATENTS

| Number | Name | Date |
|---|---|---|
| 1,021,095 | Grether | Mar. 26, 1912 |
| 2,179,209 | Daimler et al. | Nov. 7, 1939 |
| 2,299,604 | Weirich | Oct. 20, 1942 |